Dec. 21, 1954 E. KAMMERER 2,697,812
AUTOMATIC AMPLITUDE REGULATION IN ELECTRICAL
TRANSMISSION SYSTEM AND APPARATUS
Filed April 28, 1951 2 Sheets-Sheet 1
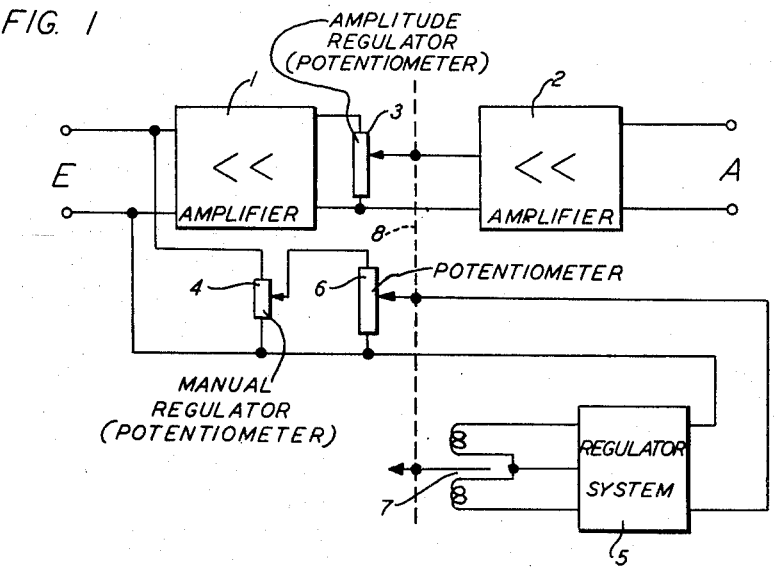
FIG. 1
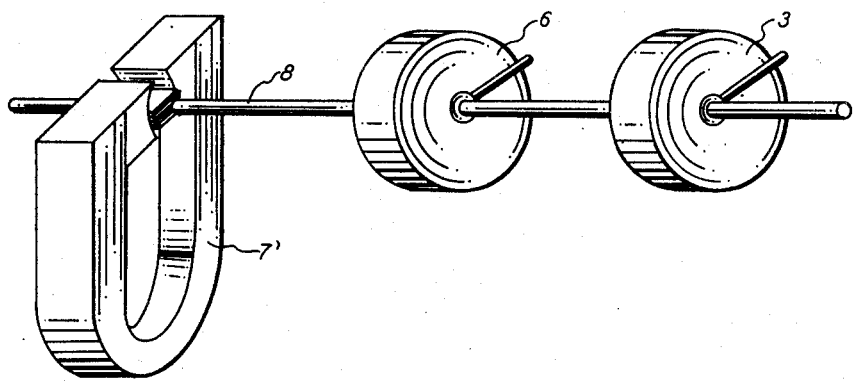
FIG. 2
INVENTOR.
ERNST KAMMERER
BY
ATT'Y Dec. 21, 1954 E. KAMMERER 2,697,812
AUTOMATIC AMPLITUDE REGULATION IN ELECTRICAL
TRANSMISSION SYSTEM AND APPARATUS
Filed April 28, 1951 2 Sheets-Sheet 2
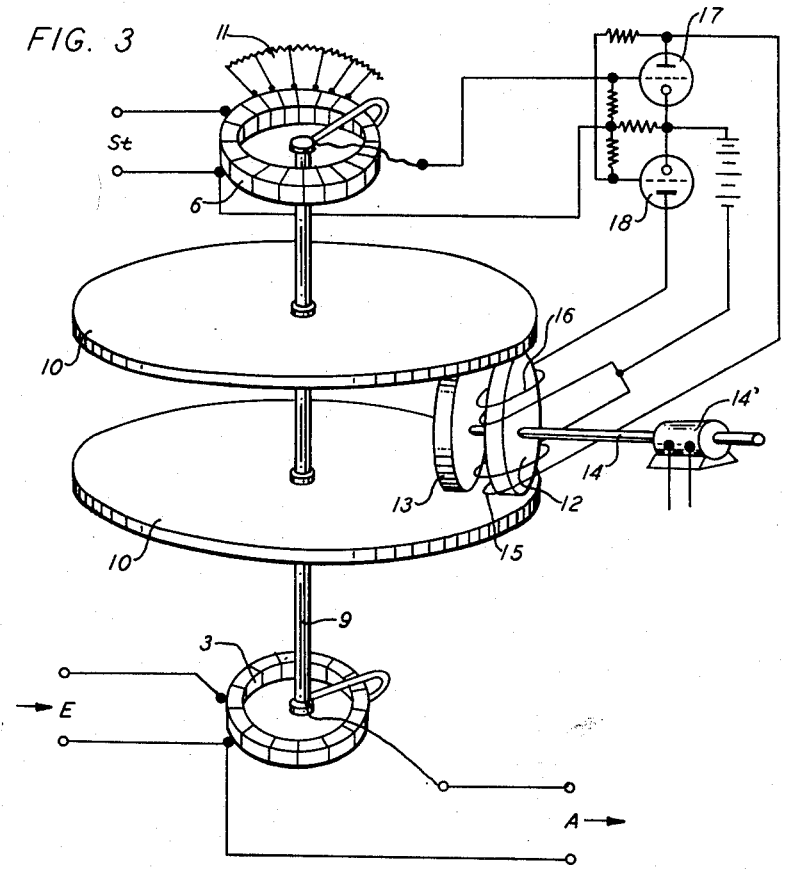
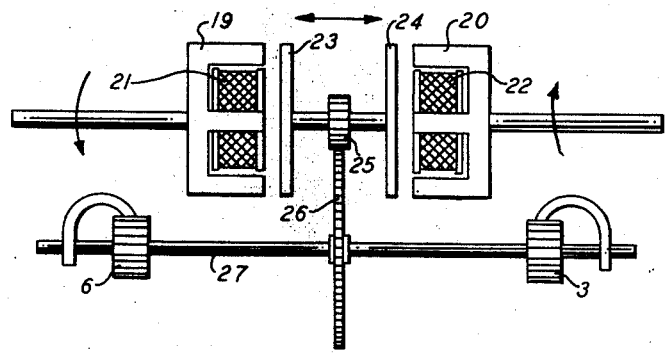
INVENTOR.
ERNST KAMMERER
BY
ATT'Y

United States Patent Office 2,697,812
Patented Dec. 21, 1954

2,697,812

AUTOMATIC AMPLITUDE REGULATION IN ELECTRICAL TRANSMISSION SYSTEM AND APPARATUS

Ernst Kammerer, Kenzingen, Baden, Germany, assignor to Klangfilm Gesellschaft mit beschränkter Haftung, Berlin and Karlsruhe, Germany, a corporation of Germany Application April 28, 1951, Serial No. 223,503

Claims priority, application Germany May 24, 1950

17 Claims. (Cl. 323—66)

This invention relates to amplitude regulation, and is particularly concerned with amplitude regulation in electrical amplifiers and in transmission systems connected therewith.

Circuits comprising regulating tubes were heretofore employed for this purpose. The material expenditure in such circuit arrangements is considerable, if control is desired within a wide regulation range, e. g., 60 db, and the operation is relatively inefficient, which is particularly due to the nonlinear distortions incident to the transmission of a frequency band with a width of several octaves. Regulation has also been proposed by electromechanical means, i. e., by using a measuring instrument for controlling the adjustment of a liquid resistor. The operation of such arrangements likewise leaves much to be desired, because the resulting mechanical forces are insufficient and because it is not possible to cover the required wide regulation range.

The invention now proposes to use for the automatic amplitude regulation an electromechanical regulation system, especially one with logarithmic characteristics, in which the regulating motion or displacement of certain elements is produced by unbalance from a predetermined zero-setting of the circuit, caused automatically by alterations of the control voltage, to govern the operation of an amplitude regulator which is connected in a transmission channel and which changes the transmission value, or, rather to say, the amplification, in accordance with a predetermined, preferably logarithmic, regulation curve in accordance with alterations in the control voltage.

It is realized in this connection that regulation systems which provide for automatic unbalance from a zero-setting are, broadly speaking, known and used, for example, for remote control purposes and for volume control in sound-recording apparatus. However, the use of the principle, in accordance with the invention, in the automatic amplitude regulation permits elimination of difficulties which could not be overcome by prior proposals.

The various objects and features of the invention will be brought out in the course of the detailed description of certain embodiments, which will presently be rendered with reference to the accompanying drawings. In these drawings, Fig. 1 shows diagrammatically the principal elements of a system employing the invention;

Fig. 2 indicates in diagrammatic manner a control element coupled with a potentiometer and with an amplitude regulator device incorporated in the system shown in the diagram of Fig. 1; and Figs. 3 and 4 are examples of electromagnetic coupling means for governing the operation of certain control and regulating elements indicated in Fig. 1.

Referring now to Fig. 1: E designates the input side and A the output side of a transmission system which may be provided, for example, for sound-recording or for sound reproduction. There are provided amplifiers 1 and 2, and between these amplifiers is disposed a potentiometer 3 forming an amplitude regulator. The input E may, for example, be connected with the output of a mixing device, and the output A may feed to a sound recorder or to a loud-speaker. The transmission system is provided for the substantially distortion-free transmission of a sound frequency band of the width of several octaves.

In accordance with the invention, the sound frequency voltage is branched off at the input side E and is conducted to the automatically operating electromagnetic regulator system 5 over a manually adjustable potentiometer 4. The circuit of the regulator system 5 is associated with an auxiliary potentiometer 6, and its output side includes a control device 7. The latter is operated in a differential circuit and adjusts the auxiliary potentiometer responsive to unbalance due to alterations of the control voltage, either directly or by means of a motor drive, until zero-adjustment or setting is again obtained in the control device 7. The auxiliary potentiometer 6 drives the amplitude regulating potentiometer 3 which, in the simplest embodiment, may be done by fixedly coupling the two devices. The control device 7 may be directly coupled with the auxiliary potentiometer 6; or, which is preferable because productive of a greater torque, it may control a suitable motor device which actuates the auxiliary potentiometer 6 and the potentiometer 3. The broken line 8 in Fig. 1 indicates schematically that the parts 3, 6 and 7 are coupled for operation. The regulation system 5 preferably contains an auxiliary amplifier (not shown in Fig. 1) which causes rectification of the control voltage. The windings of the control device 7 may be connected in opposition at the output of the auxiliary amplifier and, if desired, a phase-reversing tube may be connected in the corresponding circuit. The auxiliary potentiometer 6 is preferably arranged as an input potentiometer feeding to the auxiliary amplifier. Upon reaching zero condition in the control device 7, there will be tapped at the input potentiometer 6 a constant partial voltage, which also may be zero, and which is conducted to the auxiliary amplifier.

The control device 7 may be in the form of a measuring instrument system, preferably a rotary coil system, and the potentiometers 3 and 6 may be axially coupled therewith as diagrammatically shown in Fig. 2.

The rotary coil measuring system is indicated in Fig. 2 by numeral 7'. Its coil has two separate windings for operation in a differential circuit, or it may have one winding with a central tap. It will be possible, in certain regulation circuits, for example, in circuits employing an opposing terminal stage with anode resistors in the auxiliary amplifier, to operate with a simple winding on the rotary coil. The potentiometers 3 and 6, and the rotary coil system 7' are provided on a shaft 8 corresponding to the showing of Fig. 1. The shaft 8 may carry an indicating pointer such as is customarily used in measuring instruments. All parts are made lightweight so as to obtain their adjustment even with relatively small torque.

It is also possible to use as a control device 7 (7') a polarized relay which operates to switch on and off a motor, or which reverses the direction of rotation of a motor, the motor in turn driving the potentiometers 3 and 6. Alternatively, the motor may steadily operate instead of being controlled by the actuation of the relay, and electromagnetic coupling means may be employed which are selectively actuated as desired.

In accordance with another object and feature of the invention, the control device 7 (7') may itself be made in the form of an electromagnetic coupling, preferably with two windings which operate for selectively coupling and uncoupling the potentiometers 3 and 6.

Details of the above indicated embodiments will now be described with reference to Figs. 3 and 4.

In the embodiment Fig. 3, there is provided a control device having an electromagnetic coupling which comprises two ferromagnetic disks 10 arranged in axially spaced relation upon a shaft 9. These disks are rigidly coupled with the auxiliary potentiometer 6, which is made in the form of a rotary potentiometer, and with a correspondingly formed potentiometer forming the amplitude regulator 3. The potentiometers 3 and 6 have preferably logarithmic resistance characteristics and the current is taken off by suitable commutator means. The resistor windings of the potentiometer 6 are shown only partially at 11. They are connected with the corresponding commutator sections by taps. Approximately peripherially of the disks 10 and rotatable in a plane perpendicular thereto is disposed a ferromagnetic disk 12 coacting with a magnetic coupling in the form of a ferromagnetic disk 13 disposed on the shaft 14 in parallel therewith and axially spaced therefrom. Both the disks 12 and 13 are driven by suitable means, e. g., an electric motor 14', and rotate continuously with constant speed in a predetermined direction.

The disk 12 is provided with two windings 15—16 which are connected with the auxiliary amplifier comprising the tubes 17—18, the latter being connected in opposition. The control voltage is fed to the auxiliary potentiometer 6 at St and is conducted through its contact means to the amplifier tube 17. Additional amplifier tubes may be provided ahead of the tube 17, if desired. The tubes 17—18 operate as rectifiers, and the tube 18 receives its grid voltage from the anode circuit of the tube 17 which acts as a phase-reversing tube.

If the currents in the two windings 15—16 are identical, there will be a zero condition in the control device and the magnetic fields in the ferromagnetic disk 12 are cancelled. The disk 12 is in such condition deenergized; there is no force to attract either of the disks 10 and these disks are then at rest. This condition is present at a certain input voltage which is ascertained by the auxiliary potentiometer 6, and which also may be at zero, at a time when the anode currents of the tubes 17—18 are at identical values.

If the control voltage varies, the current in one of the two coils 15—16 will predominate. Either the upper or the lower disk 10 will then be attracted and will be placed in frictional engagement with the disks 12 and 13 to rotate therewith so as to drive the auxiliary potentiometer 6 and the amplitude regulator 3 in one or the other direction until such a time when the identical partial voltage, which corresponds to zero condition, is again ascertained by the auxiliary potentiometer 6. The potentiometer 3 adjusts during its actuation the amplitude between the input E and the output A to vary in rhythm with the variations of the control voltage.

Depending on the poling of the potentiometer 3, which may be as desired, the amplification will in one case be decreased with rising control voltage, and in the other case it will be increased. The higher amplitudes may from a certain amplitude on be limited by corresponding resistance characteristics of the potentiometer 3 and/or the auxiliary potentiometer 6. It is also possible, in accordance with the invention, by choice of suitable resistance characteristics to compress the lower and the higher amplitudes more than the median amplitudes, thereby obtaining freedom from noise and avoiding distortions due to over-regulation.

In the embodiment illustrated in Fig. 4, there is provided a control device comprising two electromagnetic coupling members 19—20 associated with windings 21—22, respectively, as shown. The coupling members are driven in opposite directions by suitable means, and rotatably disposed therebetween is a coupling having two ferromagnetic disks 23—24. The shaft carrying these disks coacts with gear means, shown in the form of toothed gears 25—26, for driving the shaft 27 which carries the auxiliary potentiometer 6 and the amplitude regulating potentiometer 3. The windings 21—22 are connected with the regulation system and with the terminal stage of the auxiliary amplifier, respectively, in a manner analogous to that shown in Fig. 3. Depending on whether the current predominates either in the winding 21 or in the winding 22, one of the disks 23 or 24 will be attracted and will be rotated to drive the shaft 27 and therewith the potentiometer 6 and the potentiometer 3 in one or the other direction to bring about the desired adjustments. The potentiometers 3 and 6 may again be equipped with suitable commutator means, as before.

The invention is applicable in cases where the sound frequency voltage which is to be amplified forms the control voltage, as is assumed in Fig. 1, and when the amplitude regulating potentiometer 3 is connected analogous to the so-called forward regulation to a serially disposed point in the transmission system. However, the invention is likewise applicable when using a separate control voltage, which may be recorded, as in the case of a sound-film, for example, on a special control track.

The regulating arrangement is preferably made so that the regulating operations are quickly initiated while fading more slowly. The time of regulation is in practice adjusted by suitable choice of speed of rotation of the drive motor. In the case of a high-speed motor the regulation time will be very short and with a slowly running motor it will be correspondingly prolonged. The manual regulator 4 shown in Fig. 1 is adapted to determine or to adjust the initial reference point for the operation.

Changes may be made within the scope and spirit of the appended claims.

I claim:

1. Apparatus for automatically regulating the amplitude of electrical oscillations in a transmission line having an input and an output circuit, said device comprising a first potentiometer in said transmission line, a control circuit extending from the input of said transmission line, a second potentiometer in said control circuit, a regulator device connected with said second potentiometer, said regulator device comprising differentiating means which are in balance in the presence of a predetermined voltage received from said second potentiometer, variations from said voltage causing said differentiating means to become unbalanced, common drive means for said potentiometers, and means governed by said differentiating means for causing said common drive means to become for the duration of said unbalance operative to simultaneously vary the adjustment of said potentiometers, the consequent adjustment of said first potentiometer varying the amplitude of the electrical oscillations in the output circuit of said transmission line and the coincident adjustment of said second potentiometer being effective to vary correspondingly the voltage transmitted therefrom to said regulator device to restore the balance of said differentiating means therein.

2. The device defined in claim 1, together with an additional manually adjustable potentiometer disposed in said control circuit ahead of said second potentiometer for determining the voltage normally transmitted to such second potentiometer.

3. The device defined in claim 1, wherein said second potentiometer has logarithmic regulation characteristics.

4. The device defined in claim 1, wherein said differentiating means comprises differential windings for governing the operation of said common drive means.

5. The device defined in claim 4, comprising means for directly coupling said potentiometers to form said common drive means therefor.

6. The device defined in claim 4, comprising a motor for driving said common drive means, and means governed by said differential windings for coupling said motor with said common drive means.

7. The device defined in claim 1, comprising means in said regulator device for rectifying the voltage received from said second potentiometer, said differentiating means comprising differential windings, and means for connecting said windings in opposition in the output of said rectifying means.

8. The device defined in claim 1, comprising means in said regulator device for rectifying the voltage received from said second potentiometer, said second potentiometer operating as an input potentiometer for said rectifying means, a constant partial voltage appearing at said potentiometer when balance of said differentiating elements is attained and such partial voltage being fed to said rectifying means.

9. The device defined in claim 1, comprising a rotary coil type device having differential windings forming said differentiating means, the axes of said potentiometers being coupled with the axis of said rotary coil type device.

10. The device defined in claim 1, comprising a polarized relay forming part of said differentiating means, a drive motor governed by said polarized relay, and means controlled by said motor for actuating said common drive means to vary the adjustment of said potentiometers.

11. The device defined in claim 1, comprising electromagnetic coupling means having two windings forming part of said differentiating means, a drive motor, and clutch means for coupling said motor to said coupling means for rotating said common drive means in either one of two directions.

12. The device defined in claim 1, comprising a pair of ferromagnetic driven disks disposed upon a common rotatable shaft, means for coupling said driven disks with said potentiometers, a ferromagnetic driving disk coacting with a magnetic coupling disk disposed peripherally of and between said driven disks, a drive motor coupled with said driving disk, and energizing means for said driving disk including said differentiating means for selectively coupling therewith either one of said driven disks.

13. The device defined in claim 1, comprising a pair of electromagnetic driving members each carrying energizing means and forming part of said differentiating means, means for driving said driving members in opposite directions, and ferromagnetic driven coupling means disposed between said driving members for selective attraction thereby under the control of said energizing means and for rotation therewith depending on selective energization of said energizing means to operate said common drive means.

14. The device defined in claim 1, wherein said first potentiometer in said transmission line is connected therein at a point spaced from the input circuit thereof.

15. The device defined in claim 1, wherein said first potentiometer in said transmission line has a resistance characteristic to provide for regulation in accordance with a logarithmic regulation curve.

16. The device defined in claim 1, wherein the resistance curve of at least one of said potentiometers is adapted to limit amplitudes exceeding a certain amplitude of the oscillations in the corresponding circuit.

17. The device defined in claim 1, wherein the resistance curve of at least one of said potentiometers is adapted to limit lower and higher amplitudes more than the median amplitudes of the oscillations in the corresponding circuit.

References Cited in the file of this patent

UNITED STATES PATENTS

| Number | Name | Date |
|---|---|---|
| 1,800,303 | Lindsay | Apr. 14, 1931 |
| 1,955,322 | Brown | Apr. 17, 1934 |
| 2,119,607 | Sterba | June 7, 1938 |
| 2,563,179 | Malsbary | Aug. 7, 1951 |
| 2,625,675 | Lupo | Jan. 13, 1953 |